Dec. 4, 1951     F. H. DOWNING     2,577,313
GYROSCOPIC APPARATUS
Filed July 20, 1949     5 Sheets-Sheet 2
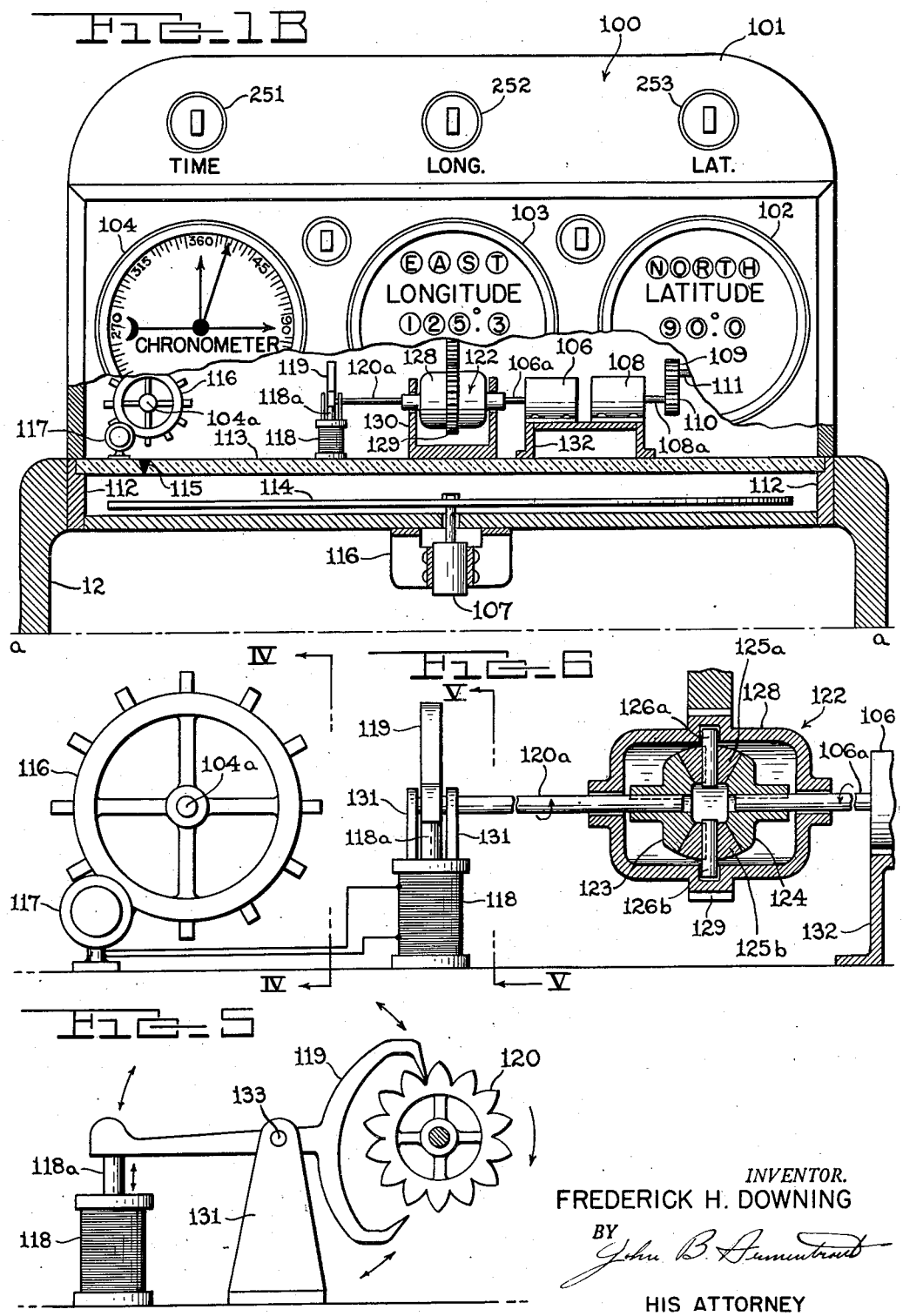
INVENTOR.
FREDERICK H. DOWNING
BY
HIS ATTORNEY Dec. 4, 1951     F. H. DOWNING     2,577,313
GYROSCOPIC APPARATUS
Filed July 20, 1949     5 Sheets-Sheet 3
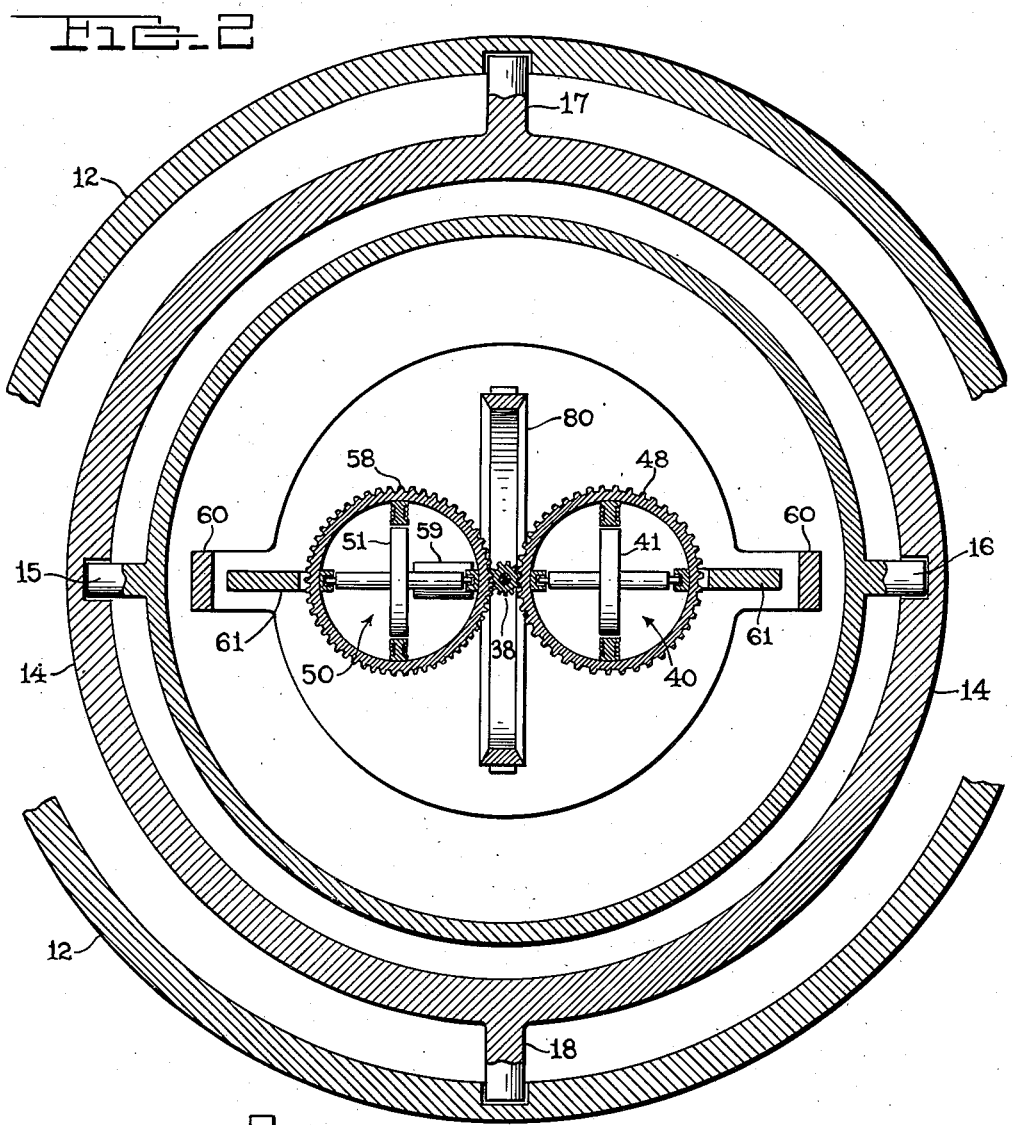
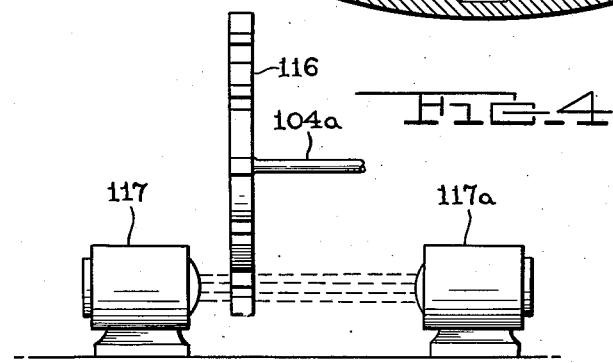
INVENTOR.
FREDERICK H. DOWNING
BY
*John B. Hummertrout*
HIS ATTORNEY

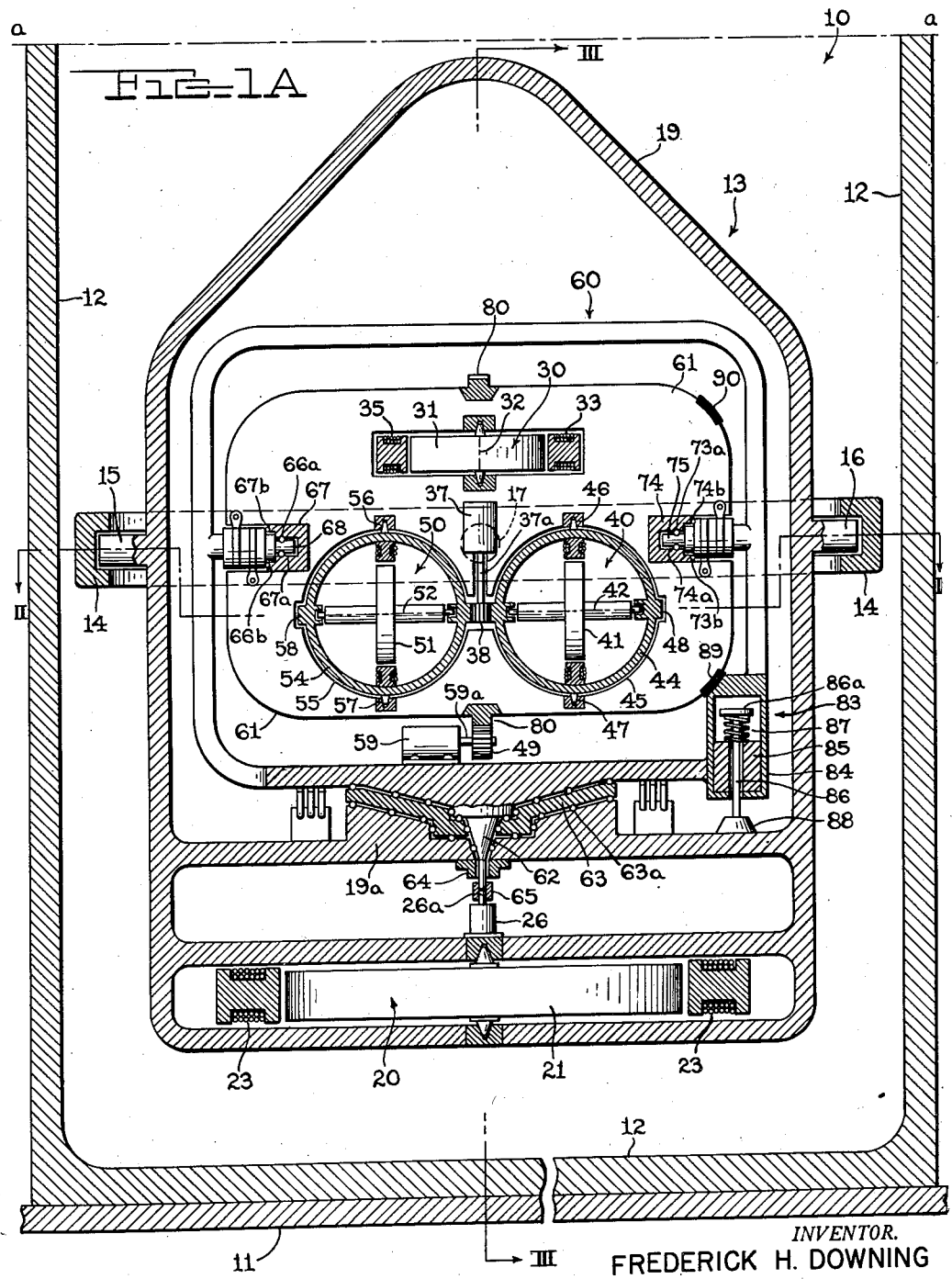
INVENTOR.
FREDERICK H. DOWNING

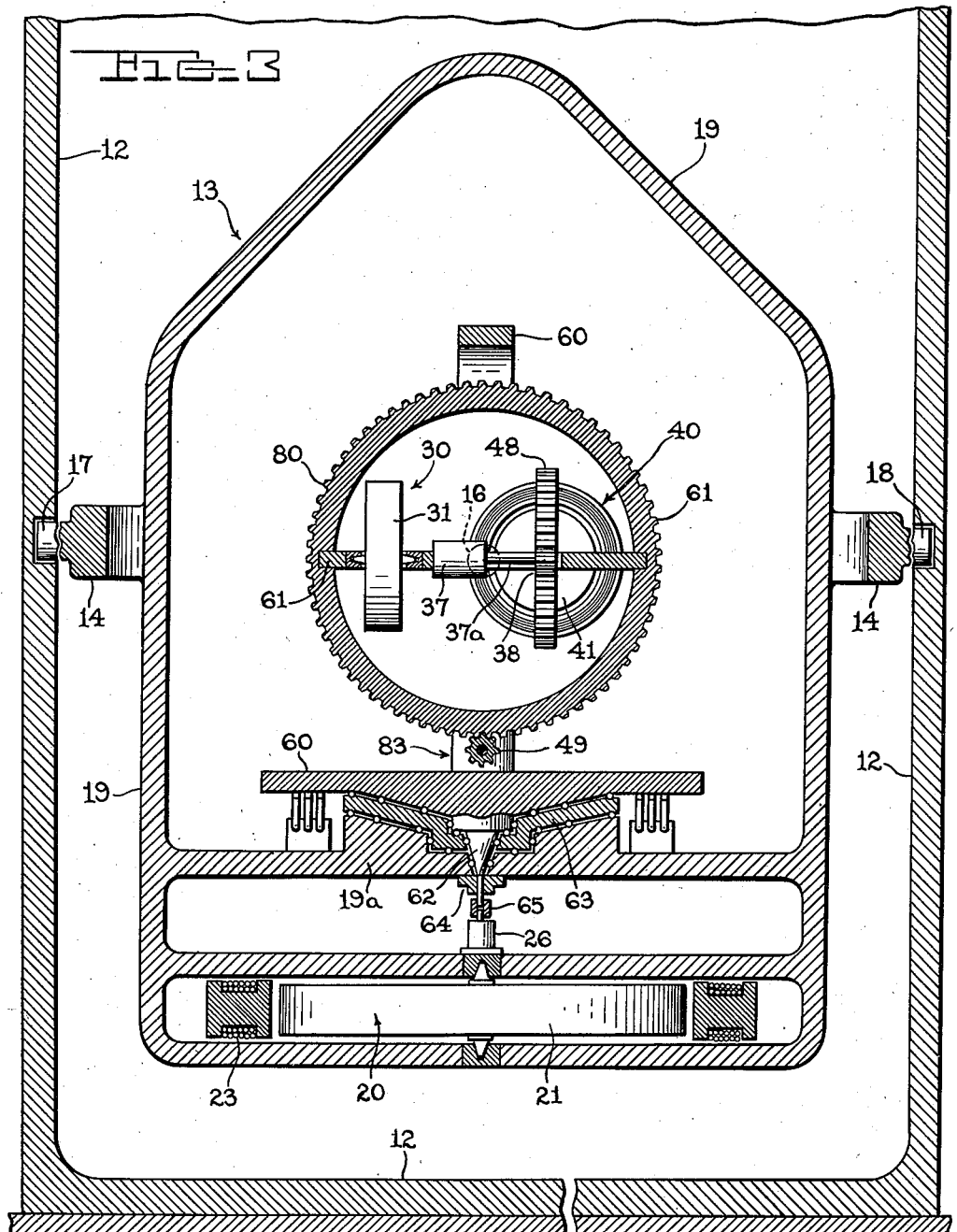

Dec. 4, 1951        F. H. DOWNING        2,577,313
GYROSCOPIC APPARATUS
Filed July 20, 1949                         5 Sheets-Sheet 5

*INVENTOR.*
FREDERICK H. DOWNING
BY
HIS ATTORNEY

Patented Dec. 4, 1951

2,577,313

UNITED STATES PATENT OFFICE 2,577,313

GYROSCOPIC APPARATUS

Frederick H. Downing, Balboa, C. Z.

Application July 20, 1949, Serial No. 105,853

18 Claims. (Cl. 74—5.34)

This invention relates to gyroscopic apparatus, and more especially to apparatus of this character for determining longitude, latitude and direction.

An object of my invention is the provision of simple, practical and reliable navigational apparatus such as for use on naval vessels, aircraft or land vehicles for determining position and direction.

Another object of this invention is that of providing a gyroscopic navigational instrument which operates substantially free of precession.

A further object of my invention is the provision of a navigational instrument for gyroscopically determining longitude substantially without precession of the longitude gyroscope means employed.

A further object of the invention is the provision of gyroscopic navigational apparatus for accurately giving direction and longitude and latitude of position throughout travel and stopping of a supporting conveyance.

Another object is the provision of navigational apparatus for determining longitude even at the earth's poles.

A still further object of my invention is the provision of a system of navigational apparatus for denoting longitude and latitude at a point remote from gyroscopes employed.

Other objects of my invention in part will be obvious and in part pointed out more fully hereinafter.

The invention accordingly consists in the combination of elements, and features of construction and operation, the scope of the application of which is indicated in the following claims.

In the accompanying drawing representing a preferred embodiment of my invention:

Figure 1A is a sectional elevation of a gyroscopic instrument with the instrument occupying a position at the north pole of the earth;

Figure 1B represents the panel of the instrument in Figure 1A;

Figure 2 is a cross section of the instrument taken along the line II—II in Figure 1A with the instrument in the same position as before;

Figure 3 is a sectional elevation taken along the line III—III in Figure 1A and with the instrument at the earth's equator;

Figure 4 illustrates certain certain details of a chronometer controlled light ray breaking system in the navigation instrument;

Figure 5 is a side view, partially in section, representing certain details of the chronometer controlled driving mechanism of the instrument;

Figure 6 represents details of a differential gear connection in longitude measuring system of the instrument.

Like reference characters denote like parts or portions throughout the several figures of the drawing.

Figure 7:
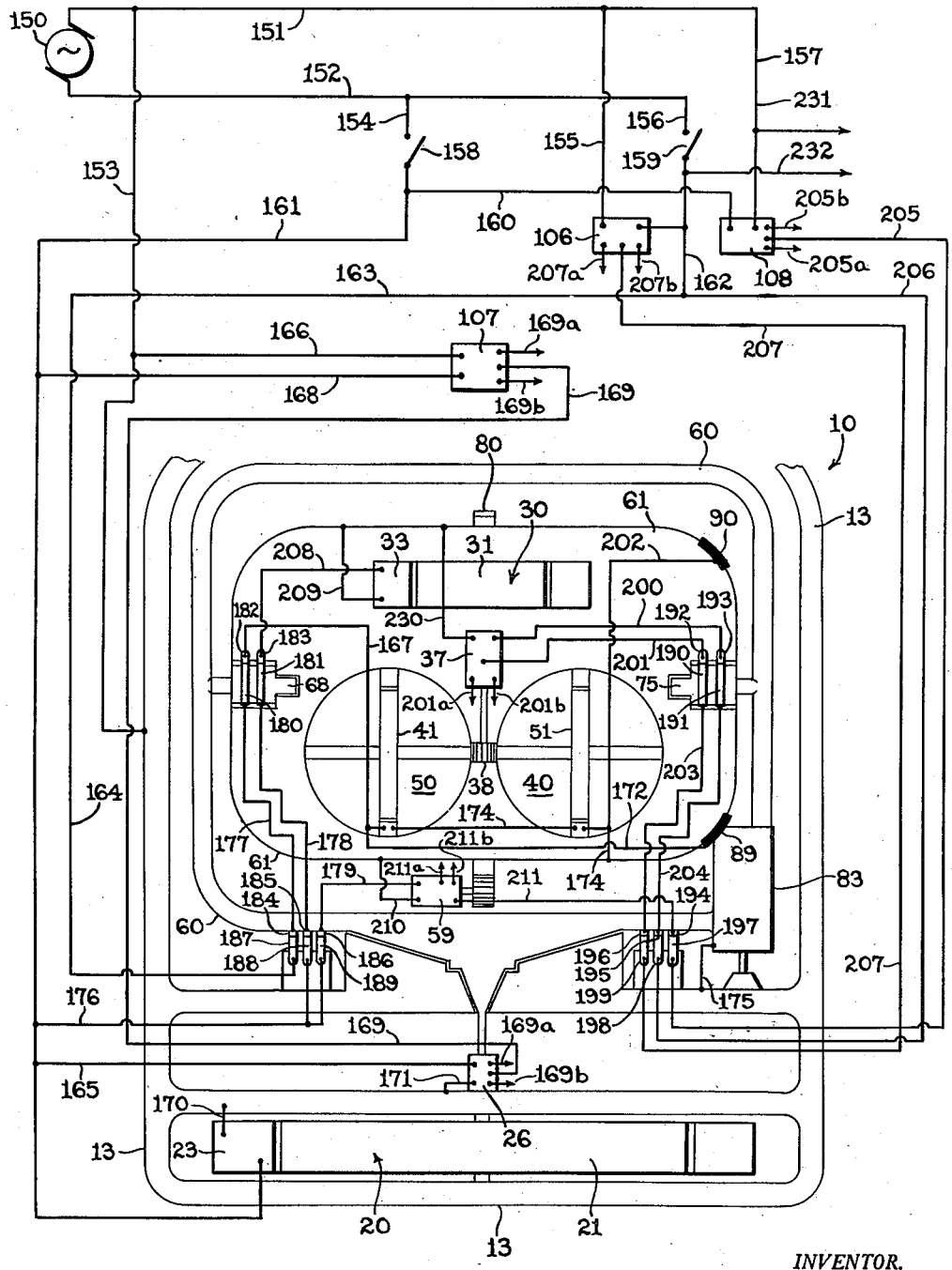
Figure 7 is a wiring diagram applied to the instrument.

As conducive to a clearer understanding of certain features of my invention, it may be noted at this point that gyroscopic navigational instruments heretofore have been utilized for determining one or more such factors in navigation as longitude, latitude and direction. In those devices where longitude and latitude are to be measured, for example, it is conventional to employ a polar gyroscope and an east-west gyroscope, these for maintaining initially set positions in space under conditions of spin. The polar gyroscope is employed to preserve an axis of spin parallel to the polar axis of the earth and to accommodate relative movement of support means to give a measure of latitude by variation of the angle so formed. The east-west gyroscope is for maintaining its axis of spin parallel to the equatorial plane of the earth, so that support means for the rotor of this gyroscope may deflect to give a measure of longitude. The latter deflection is dependent for example upon movement east or west by a conveyance on which the instrument is used, but further may be affected by rotation of the earth, such as when the conveyance is stopped and produces no change in longitude. In this connection, it is well known of course that the earth undergoes a complete revolution on its polar axis in a sidereal day, this in terms of ordinary clock time being approximately 23 hours, 56 minutes and 4.1 seconds. With the east-west gyroscope presumably maintaining a fixed position in space, the gyroscope support, where having freedom of motion substantially at right angles relative to the rotor spin axis, undergoes a complete revolution in a sidereal day, for no change in longitude. Where the conveyance is moving through different longitudes, however, the sidereal rotation of the east-west gyroscope support is either increased or decreased depending upon whether the conveyance is being moved to the west or to the east. It is this increase or decrease, as the case may be, which proper conditions may be used to represent changes in longitude.

A number of difficulties leading to inaccuracies, however, have been encountered in many of the conventional gyroscopic navigational instruments. Outstanding among these difficulties is precession. Precession is a motion which results from a tilt compounded with momentum of a high speed gyroscope rotor, and has a direction approximately at right angles to the primary displacing or tilting effort. The mechanics, geometry and mathematics of the development of precession are well known to those skilled in the art and an extended consideration here is believed unnecessary. It may be noted, however, that the direction of precession depends upon the direction of the tilt and the direction of rotation of the gyroscope rotor. For instance, as viewed endwise, a downward dip of a rotor axle will cause precession to the left if the rotor is spinning clockwise, or to the right if the rotor is spinning counterclockwise; or an upward tilt would cause precession to the right if the rotor is spinning clockwise, or to the left if spinning counterclockwise. In this connection, it may be said that the full elimination of friction from a gyroscope is impossible of achievement. Thus, especially in many of the heretofore known gyroscopic navigational instruments employed for measuring longitude, there is a pronounced tendency for the east-west gyroscope to precess to polar position due to the friction developed at the pivotal mountings by sidereal rotation of the earth to the east. A further source of movement often leading to friction and torque, causing precession, occurs upon movement to the east by the conveyance on which the instrument is mounted. Under the latter condition the gyroscope rotor supports usually pivots through more than 360° in a single sidereal day. The relative movement of the mountings of a polar gyroscope around the polar parallel axis of spin usually is more gradual since the spin of the earth does not contribute to the movement. Also, the measurement of latitude is usually less affected by precession of the polar gyroscope since one of the effects of precession in gyroscopic navigating instruments is the tendency of the precessing gyroscope to seek polar position. Under certain circumstances, however, precession of the east-west gyroscope has been known to cause serious deviation of the polar gyroscope and thus introduce inaccuracies in both longitude and latitude readings obtained. Displacement of the polar gyroscope from direction in space also affects compass readings where the preservation of this direction governs accuracy of the readings. While efforts have been made in the prior art to overcome detriments of precession, this often has lead to cumbersome and not appreciably effective equipment.

An outstanding object of my invention accordingly is the provision of simple, compact and reliable gyroscopic apparatus for determining longitude, latitude and direction substantially free of the detrimental effects of precession of the longitude gyroscope means.

Referring now more particularly to the preferred embodiment of my invention (see the accompanying drawing) I provide a gyroscopic navigational instrument 10 for determining longitude, latitude and direction. The instrument preferably includes casing 12, this for example being suitably fastened to the deck 11 of a marine vessel and serving as a support and protective enclosure for a carriage 13. This carriage illustratively comprises a frame 19 pivotally supported by laterally extended stub shafts 15 and 16 in a gimbal ring 14, which in turn is supported for rotation at right angles to the latter pivots by stub shafts 17 and 18 extending into the walls of the instrument casing 12. The stub shafts 15, 16, 17 and 18 preferably have their respective axes all substantially in the same plane. When the instrument 10 is in the installed position, stub shafts 15 and 16 illustratively are in alignment with each other at right angles to the bow-to-stern center line of the marine vessel or other conveyance, and the stub shafts 17 and 18 also are in alignment with each other, but are parallel to this same center line.

A stabilizing gyroscope having a rotor 21 serves to maintain verticality of the carriage 13 and to lend stability to other components of the instrument 10. The stabilizing gyroscope rotor advantageously has its axis of spin in alignment with the vertical axis of the navigating instrument, and preferably is the armature of a suitable electric motor 20, this motor for example being fixed to the lower portion of frame 19 and including the field windings 23. The stabilizing gyroscope thus embodies pendulous pivotal connection of the rotor 21 with the instrument case 12, the connection being through carriage 13, stub shafts 15 and 16, gimbal ring 14 and stub shafts 17 and 18. Movement of the deck 11 and instrument case 12 accordingly may be absorbed at the pivot points formed at shafts 15, 16, 17 and 18. Beyond those points for example, the effective dead weight of the instrument 10 coupled with spin of the rotor 21 preserve alignment of the carriage 13 to the center of gravity of the earth, and the stabilizing gyroscope resists swaying disturbances caused by rolling, pitching or vibrations of the ship or other conveyance on which the navigational instrument is used.

The instrument 10 comprises a head 60 which is pivotally supported to a cross-portion 19a of the frame 19. For this purpose, the head conveniently includes a spindle 62 which passes through a low-friction disc bearing element 63, dished in shape and having races and corresponding balls 63a in the races on opposite faces thereof. Some of these balls are so positioned as to prevent lateral thrust of the spindle. In this, the bearing element 63 is confronted by substantially conforming faces of the frame cross-portion 19a and head 60, and serves to separate the head and frame for rotation with low friction. Below the bearing element, the spindle passes through an opening in the cross-portion 19a with substantial clearance against binding or rubbing against the walls of this opening. The spindle conveniently is long enough to have an end below the cross-portion, there to receive a shaft coupling 65 and thus be in full rotary connection with the armature shaft 26a of a synchro transmitter 26. A spacing ring 64 mounted around the spindle 62 with clearance, such as by welding to the underneath of cross-portion 19a, is slightly behind the shaft coupling so as not to rub against the same, while preventing withdrawal of the head 60 from the bearing or pivot of which the spindle forms a part. The general shape of the head conveniently is that of a rectangular frame, the spindle 62 extending vertically downward from the midpoint of the lower side. The head also includes aligned inwardly extending horizontal arbors 68 and 75, these being on the vertical legs of the substantially rectangular frame to provide an axis which is at right angles to the axis of spindle 62, as in a plane with the axis of stub shafts 15 and 16.

Bed means, such as substantially flat plate 61 having bushings 67 and 74 individually receiving the respective arbors 68 and 75, affords a base for an electric motor 30, this motor including field windings 33 and an armature 31 which is the rotor of a polar gyroscope. The motor 30 in fact is of any suitable type for gyroscopic use and conveniently fits within an opening 35 in the plate 61, the rotor or armature 31 preferably having its axis of spin 32 substantially in the plane of the plate after the motor is mounted to the latter by suitable fastening means.

The bushings 67 and 74 conveniently fit in slots on opposite sides of the plate 61 and are secured to the plate as by welding in axial alignment, the axis for example falling within the thickness of the plate. The bushings respectively have axial bores 67a and 74a which are enlarged toward the outside to produce shoulders 67b and 74b having annular faces. Arbors 68 and 75 respectively have reduced diameter portions inside the bores 67a and 74a and are separated from the bushings by ball race bearings 66a and 73a. Next to the shoulders 67b and 74b, the arbors increase in diameter and thus afford shoulders for supporting thrust bearings 66b and 73b against the annular faces of the bushings, to prevent side thrust of the plate 61 and binding or rubbing of the inner ends of the arbors against the bushings. Bearings 66a and 73a assure freedom of rotation between the head 60 and plate 61.

A ring gear 80 having its rotational center on the transverse axis of support of the plate 61, as defined by the bushings 67 and 74, arbors 68 and 75, and the related bearings, meshes with a pinion 49 which is on the armature shaft 59a of a synchro transmitter 59. This transmitter is fixed to the lower portion of the head 60. Its function will be explained more fully hereinafter.

From the preceding it will be seen that the polar gyroscope in the present embodiment provides two planes of turning freedom of the rotor 31, for the gyroscope includes the bed or plate 61, the head 60 and is pivotal at the arbors 68 and 75 and at the spindle 62. This gyroscope thus is suited to maintain a substantially fixed position in space, and is useful for measuring latitude, preferably by setting the rotor 31 with its axis of spin 32 parallel to the polar axis of the earth and supplying electric current to the motor 30 for rotating the armature or rotor in a direction corresponding to the direction of spin of the earth. Latitude is directly related to the angle between the vertical axis or spindle axis of the instrument head 60 and the polar axis of plate 61 or axis of spin 32. At any point on the earth's equator for example, the polar and transverse axes of the plate 61 are parallel with a plane that is tangential in all directions to that point on the equator. By the rotor 31 maintaining a fixed position in space, the transverse axis of the instrument plate becomes tangential in an east-west direction, to any point to which the instrument is moved relative to the earth. Should the instrument 10 be moved to either pole of the earth from the equator, the axis of spindle 62 moves from a vertical position relative to the axis of spin 32, to alignment with this axis of spin.

An indication of latitude advantageously is had on a direct reading portion of the navigational instrument 10, this for example being a panel 100 having a housing 101 through the front side of which legible portions of a latitude register 102 are visible. These legible portions give an indication of north or south latitude in degrees and for example are operated in any suitable manner under the driving action of a synchro receiver 108 inside the housing 101 and corresponding to the synchro transmitter 59. The driving action conveniently is achieved by armature shaft 108a of the receiver and a pinion 110 fast on this shaft and meshing with pinion 109, rotatably mounted on shaft 111, leading to the inner workings of the meter which are reversible for driving in either direction by the receiver.

The instrument panel 100 conveniently has a horizontal extension 112 to the front thereof having a glass or other transparent covering 113. On the bottom of the extension 112 and fastened to the same is a support 116 which carries in fixed relation a synchro receiver 107 corresponding to the synchro transmitter 26. The armature shaft of this receiver reaches through an opening in the bottom of extension 112 and rotatably carries a compass card or disc 114 graduated in degrees and fractions of degrees and visible under the transparent covering 113. A fixed pointer 115, such as painted on the surface of the transparent covering 113 gives a reading with relation to the compass card or dial, as for example a north reading when the conveyance on which the instrument is used is heading due north. The direction readings in fact are related to the turning of the instrument carriage 13 relative to the spindle 62 and the instrument head 60. Since the carriage 13 is gimbaled to the instrument casing 12 and the casing is secured to the conveyance, turning will occur between the carriage and head when the conveyance changes direction while the polar gyroscope is operating and the rotor 31 maintains a fixed position in space. Any movement between the instrument carriage and head accordingly is relayed from the synchro transmitter 26 to the corresponding receiver 107 which rotates the compass card 114 relative to the fixed pointer 115 for indicating the new direction.

I find that gyroscope rotors having their mountings coupled together for counteracting precession are especially useful for the measurement of longitude and resisting tendencies to precess to the polar position. Thus, in the navigation instrument 10 there are advantageously two oppositely spun east-west rotors which have their mountings coupled together on the same gyroscopic support. These are the rotors 41 and 51, afforded as armatures of electric motors 40 and 50 fastened to the frames 44 and 54 in openings 45 and 55 of the instrument bed means such as plate 61. The frame 44 has low-friction pivots 46 and 47 with plate 61, these pivots being on an axis substantially at right angles to the axis of spin 42 of rotor 41. Similarly, frame 54 has low-friction pivots 56 and 57 with plate 61, on an axis substantially at right angles to the axis of spin 52 of rotor 51 and parallel to the axis of pivots 46 and 47. The pivots 46 and 47, and pivots 56 and 57 preferably have their axes parallel to the spin axis 32 of the polar gyroscope rotor 31.

On the frame 44, such as welded on or otherwise fastened thereto, is a ring gear 48 having its rotational center on the axis of pivots 46 and 47. A ring gear 58 likewise is on the frame 54 and has its rotational center on the axis of pivots 56 and 57. A pinion 38 meshes with the ring gears 48 and 58, thus interconnecting the same, and is on the armature shaft 37a of a synchro transmitter 37 fixed to the instrument plate 61, shaft 37a for example being in alignment with the spin axis 32 of the polar gyroscope rotor 31. By the connection afforded by pinion 38 between the ring gears 48 and 58, a force, such as torque developed at pivots 46 and 47 for example, tending to tilt frame 44 and accordingly the spin axis 42, is transmitted through the pinion to frame 54 and accordingly tends to tilt the spin axis 51. The force thus applied to the oppositely spinning rotors produces precessional effects which resist each other, for the pinion 38 assures tilting of the spin axes 42 and 52 in like directions, and rotors 41 and 51 have opposed spins. Thus, as where the plate 61 is inclined away from the axis of spindle 62 during use of the navigation instrument 10, the tendency of precession about this spindle is effectively counteracted. Also, should friction develop a torque on spindle 62 under conditions tending to cause apparent end-over-end precessions of the spin axes 42 and 52, these precessional tendencies would effectively oppose each other through the coupling afforded by the pinion 38.

Gyroscope motors 40 and 50 and their corresponding rotors advantageously are substantially alike and operate at the same speeds in the opposite directions of rotation. The frames 44 and 54, inclusive of ring gears 48 and 58 and the pivotal mountings to the plate, preferably are substantially alike and advantageously are installed with the motors 40 and 50 so that precessional effects on the several east-west gyroscope rotors in the assembly will be substantially equal and opposite. Frames 44 and 54 for example are so connected together through ring gears 48 and 58 and pinion 38 that the spin axes 42 and 52 pass substantially to alignment with each other in the plane of plate 61 and thence preferably through a series of parallel positions relative to each other by rotation of the plate at pivots 46, 47, 56 and 57 while the rotors 41 and 51 maintain a fixed direction in space. Plate 61 and the various components thereon, such as the motors 30, 40 and 50, advantageously produce a condition of balance on the axis of arbors 68 and 75. In this manner, for example, the operation of the polar gyroscope is substantially free of eccentricity caused by unbalance of the plate and thus is all the more effective for maintaining a fixed direction in space. East-west gyroscope rotors 41 and 51 preferably are in balance with rotor 31 across the axis of arbors 68 and 75 and accordingly are better suited for maintaining their direction in space.

With the instrument 10 having the spin axis 32 of polar gyroscope rotor 31 set to parallelism with the polar axis of the earth, as hereinbefore described for measurement of latitude and direction, axes 42 and 52 of the east-west gyroscope means then are parallel to a plane through the earth's equator. Thus, with the rotors 41 and 51 operating in their opposite directions of spin, and with the instrument 10 disposed for operation along a given polar meridian, there is an apparent end-over-end turning of the rotors 41 and 51 through 360° on pivots 46 and 47 and pivots 56 and 57 for each sidereal day or complete revolution of the earth on its polar axis. This apparent end-over-end rotation in fact is a turning of the plate 61 relative to the frames 44 and 54 at pivots 46, 47, 56 and 57 while the frames and rotors maintain a fixed direction in space. The turning produces a driving action by ring gears 48 and 58 on pinion 38 and accordingly the armature of synchro transmitter 37 is driven by shaft 37a. A synchro receiver 106 operatively connected with the transmitter 37 has a power output shaft 106a and, for example, is supported to the instrument panel 100 as by means of support 132 which also carries the latitude receiver 108. Meanwhile, the oppositely spinning rotors 41 and 51 produce bucking precessional forces to each other and accordingly resist displacement from fixed direction in space. This also tends to maintain stability of the polar rotor 31.

To compensate for the effect of sidereal rotation of the earth on the rotation of pinion 38 and ensuing operation of the corresponding synchro transmitter 37 and receiver 106, and gain a measure of longitude, I find advantage in using a differential gear 122 as between a chronometer 104 and the receiver just noted. The chronometer 104 for example is mounted on the instrument panel 100 with its face exposed at an opening through the latter, and the differential gear illustratively is supported to this panel as by means of a substantially U-shaped bracket 130. The legs of the bracket have aligned openings affording bearings for arbors on the opposite sides of casing 128 of the differential gear. A ring gear 129, such as integral with the casing 128 and disposed around the outside thereof, serves to operate a longitude register 103, the latter conveniently being mounted on the instrument panel so as to have its face visible at a suitable opening in the panel. The register 103 embodies suitable metering mechanism which may be driven in either direction by the gear 129 if need be to indicate position in degrees and whether the position is east or west of a given meridian.

Inside the differential gear casing 128 are two bevel gears, one of these being gear 124 affixed for rotation with the power output shaft 106a of receiver 106, and the other being gear 123 having driven connection with a shaft 120a operated by the chronometer 104. The shafts 106a and 120a are journaled in the arbors of differential gear casing 128 so as to be in axial alignment and thus are rotatable relative to each other and to the casing. There are for example three bevel pinions meshing with the bevel gears 123 and 124. These pinions are respectively carried by stub shafts 126a, 126b and 126c, inside the casing 128 and fixed at 120° intervals to the casing wall, thus to rotate with the same as a unit. The bevel pinions are mounted for rotation relative to their supporting stub shafts.

For rotating the shaft 120a and accordingly the bevel gear 123, chronometer 104 illustratively has a time shaft 104a on which there is a ray breaker wheel 116. The wheel is disposed between photoelectric cell 117 and a light beam source 117a (see Figure 4) for periodically interrupting the beam to the cell. The electrical impulses thus produced at the photoelectric cell are transmitted through a suitable relay system including the cell and a solenoid 118 having an armature 118a. In the path of the armature for operation by the same is a two-pointed pawl 119 (see Figures 5 and 6) having a pivot 133 with a support 131 on the instrument panel. The pawl oscillates on its pivot 133 by reciprocation of the solenoid armature 118a and the points of the pawl alternately engage the teeth of gear 120 and thus advance the gear for rotating shaft 120a and bevel gear 123. That end of the pawl next to the solenoid core conveniently is relatively heavy for returning to lower position by gravity once driven upward by the solenoid. It is during the up stroke of the solenoid core that one of the pointed ends of the pawl advances the gear 120, and during the down stroke that the other pointed end advances this gear. It will thus be seen that the double pointed pawl is double acting in its driving effect, and advantageously prevents detrimental back rotation of the gear 120 such as might be introduced by forces in the differential gear 122. Also, it will be seen that the photoelectric cell system advantageously prevents backward forces on the chronometer time shaft 104a.

When the instrument 10 is not being moved to the east or to the west, synchro transmitter 37 relays a rotation to the synchro receiver 106 and the bevel gear 124, this preferably being equal to the revolutions of the bevel gear 123 which is driven in the opposite direction by the chronometer at a rate corresponding to the rate at which the rotation of the earth causes the gear 124 to turn in the synchro system. This results in no movement of the differential ring gear 129 and consequently introduces no change in the longitude reading of register 103 on the instrument panel. In moving the instrument 10 to the east, the relative movement between plate 61 and rotors 41 and 51 is increased as compared with the movement achieved by sidereal rotation of the earth alone. This increased rotation accordingly is imparted to the pinion 38 and through the synchro system including transmitter 37 and receiver 106 to the bevel gear 124. The differential gear 122 automatically subtracts sidereal effects at bevel gear 123 and the remaining rotation, representing that caused by change in longitude, results in a turning of ring gear 129, to operate the register 103 by an amount corresponding to the change in longitude. When instrument 10 is moved to the west the motion between plate 61 and rotors 41 and 51 is less than that produced by sidereal rotation of the earth alone. This decreased rotation accordingly is transmitted to pinion 38 and thence to bevel gear 124 which subtracts from the sidereal rotation of bevel gear 123 to produce a rotation of ring gear 129 representing change in longitude. The longitude factor in this instance though causes the ring gear to turn in an opposite direction as compared with the effect of a longitude factor resulting from movement of the instrument 10 to the east. Thus the longitude register 103 is driven in a reverse direction by the ring gear 129 to change the longitude reading for westerly movement of the navigation instrument.

My navigation instrument 10 advantageously includes locking means for locking and unlocking the instrument head 60 to the carriage 13. The locking action is to maintain accurate operation of the longitude register 103 at the earth's poles where turning of the instrument carriage 13 about spindle 62 is directly related to longitude. If the instrument were not locked during change of course at the poles, longitude would be lost should the east-west gyroscope rotors 41 and 51 tend to hold the plate 61 in its original position. The locking conveniently is accomplished by an electro-magnetic lock 83 which includes a casing 84 mounted on the instrument head 60. Inside the casing there is a solenoid winding 85 and core 86 having a relatively large diameter end 86a. Surrounding the core 86 and interposed between end 86a and winding 85 is a helical spring 87 thus to bias the core in favor of upward movement. A brake element 88 such as a rubber foot is secured to a lower end of the core 86 outside the casing 84 for frictionally engaging an adjacent surface of the instrument carriage when the instrument 10 is in the immediate vicinity of either of the poles of the earth. This frictional engagement occurs by virtue of completion of an electrical circuit for energizing the magnetic lock 83 through brush 89 or brush 90 disposed on the instrument plate 61. Brush 89 comes in contact with casing 83 at the north pole of the earth, and brush 90 serves a like function at the south pole, by virtue of the relative movement of head 60 and plate 61 for latitude measurement. Energization of the magnetic lock 83 forces core 86 down, compressing spring 87, until frictional engagement of brake 88 is had against the instrument head 60. This engagement prevents rotation of spindle 62 relative to carriage 13. Under these conditions, the instrument plate 61 turns with the ship or other conveyance and the longitude gyroscope rotors in maintaining their axial directions apparently turn end-over-end as the instrument plate takes up its new position in longitude. As previously explained, the apparent end-over-end turning of the rotors 41 and 51 relays movement through synchro transmitter 37 and receiver 106 which operates the longitude register 103 through the differential gear 122, which in this instance produces a longitude reading at the earth's poles. The locking of the head 60 and carriage 13 also preserves direction indicated by pointer 115.

Upon movement of the instrument 10 away from either pole of the earth, plate 61 and head 60 undergo a relative movement at arbors 68 and 75. This displaces brush 80 or 90, as the case may be, from circuit-completing position to the electro-magnetic lock 94. The lock accordingly is de-energized and core 86 is urged upward by compression in spring 87 to free brake 88 from frictional engagement against carriage 13. Spindle 62 and carriage 13 therefore are once more free to revolve relative to each other and this rotational freedom advantageously prevails until either brush 89 or 90 is again brought to circuit closing position in accordance with latitude.

An electrical system more particularly represented in Figure 7 includes the navigation instrument 10, which for example operates on alternating current supply in registering latitude, longitude and direction. For conducting the electrical current, the instrument conveniently includes a plurality of collector rings 184, 185, 186, 194, 195 and 196 mounted on the underneath side of head 60 and electrically insulated from each other. Respectively corresponding to these rings and individually contacting the same, are a plurality of brushes 187, 188, 189, 197, 198 and 199 fixed to the instrument carriage 13 and electrically insulated from each other. These collector rings and brushes maintain electrical connection across the carriage 13 and head 60 despite relative movement of the latter two elements as permitted by the spindle 62. Fixed on the arbor 68 are collector rings 180 and 181; likewise, there are collector rings 190 and 191 fixed to arbor 75. These rings are electrically insulated from each other, and brushes 182, 183, 192 and 193 individually contact the rings and are fixed in electrically insulated relation to each other on the instrument plate 61. Plate 61 and head 60 accordingly may undergo relative rotation at the arbors 68 and 75 without destroying the brush and ring electrical connections.

An alternating current generator 150 illustratively supplies operating current to the instrument 10 and includes an output line having the leads 151 and 152. The motor 30 of the polar gyroscope is in a circuit which may be traced from generator 150 through leads 152 and 154 to a control switch 158 for starting and stopping the motor and accordingly the polar gyroscope rotor 31. From the switch, which for example is suitably mounted on the instrument panel 100, the circuit continues through leads 161 and 176 to brush 188, collector ring 185 and thence through lead 178 to collector ring 181, brush 183, lead 208, motor 30, lead 209 to plate 61. The current then courses from the plate through arbor 68 for example, and through head 60 and spindle 62 to carriage 13. Lead 153 completes the circuit back to lead 151 and generator 150.

The synchro transmitter 59 and receiver 108 for measuring latitude, illustratively have their armatures energized in parallel from the energizing circuit of the polar gyroscope motor 30 and are under the control of switch 158. The circuit of transmitter 59 beginning with generator 150 includes leads 152, 154 and switch 158, leads 161, 176 to brush 189, collector ring 186, lead 179 to the transmitter, lead 210 to the plate 61. From the plate the circuit returns for example thorugh arbor 68, head 60, spindle 62, carriage 13 and leads 153 and 151 to the generator. Receiver 108 is in circuit with the generator through leads 152 and 154, switch 158, and leads 160, 157 and 151. The field windings of transmitter 59 and receiver 108 are connected together for the synchronous operation, one connection of which for example is represented by lead 205, brush 197, collector ring 194 and lead 211. Similar parallel connections of the field windings illustratively extend between leads 205a and 211a, and leads 205b and 211b.

Motor 20 of the stabilizing gyroscope is energized in parallel with the polar gyroscope motor 30. The circuit in this instance may be traced from generator 150 through leads 152 and 154 and switch 158 to lead 161, thence to the motor 20. The current returns through lead 170, carriage 13 and lead 153 to the generator.

The synchro system including transmitter 26 and receiver 107 for measuring direction, illustratively embodies parallel connection of the transmitter and receiver armatures in the energizing circuit of polar gyroscope motor 30. Thus, for energizing the transmitter 26, there is a circuit from generator 150 through leads 152, 154 and switch 158, along leads 161 and 165 to the transmitter and thence along lead 171 to the carriage 13. Lead 153 returns the current from the carriage to lead 151 and thus back to the generator. Also, a circuit for the receiver 107 is traceable from the generator through leads 152, 154 and switch 158, along leads 161 and 168 to the receiver, and back along leads 166, 153 and 151 to the generator. The field windings of transmitter 26 and receiver 107 are connected together for the synchronous operation, one connection of which for example is represented by lead 169. Similar parallel connections of the field windings illustratively are had by leads 169a and 169b.

Gyroscope motors 40 and 50 in the system illustrated in Figure 3 are connected in series for rotation of their armatures 41 and 51 in opposite directions of space. In this, the generator 150 is in circuit through leads 152 and 156, switch 159, leads 162, 163 and 164, brush 187 and collector ring 184, lead 177, collector ring 180 and brush 182 and lead 167, with the mo-
tor 50, the circuit continuing through lead 174, motor 40 and lead 174 to plate 61 to connect both of these motors in series. Current returns to the generator 150 from plate 61 as through arbor 68 and head 60, spindle 62, carriage 13 and leads 153 and 151.

Synchro transmitter 37 and receiver 106 used for measuring changes in longitude are connected in parallel with the generator 150 and are controlled by switch 159 as are the motors 40 and 50. Thus, a circuit may be traced from generator 150, through leads 152 and 156, switch 159, leads 162 and 206 to brush 198 and collector ring 195 through lead 204, collector ring 191, brush 193 and lead 200 to synchro transmitter 37. From the transmitter the current returns through lead 230, plate 61, head 60, carriage 13 and leads 153 and 151 to the generator 150. Receiver 106 meanwhile is energized by the generator through leads 152 and 156, switch 159, lead 162 to the receiver, and leads 155 and 151 back to the generator. The field windings of transmitter 37 and receiver 106 are connected for the synchronous operation, one connection of which for example is represented by lead 201, brush 192, collector ring 190, lead 203, brush 196, ring 199 and lead 207. Similar parallel connections of the field windings illustratively extend between leads 201a and 207a, and leads 201b and 207b.

The electro-magnetic lock 84 conveniently has its winding 85 energized under the control of switch 159, and contacts 89 and 90 for secondary control. The winding illustratively is connected in parallel with the energizing circuit of motors 40 and 50 through lead 172, contact 89 and lead 175, or through leads 174 and 202, contact 90 and lead 175 depending upon whether the instrument 10 is at the north or south pole of the earth.

For functioning with the chronometer 104, photocell 117, light beam source 117a and solenoid 118 conveniently receive their energizing current from leads 231 and 232 under the control of switch 159 so as to be turned on and off with motors 40 and 50 of the longitude measuring system.

The instrument panel 100 conveniently includes a manual setting knob 251 or the like which may be depressed to engage a suitable clutch thus to set the chronometer to desired time indication. A manual set 253 on the instrument panel is useful for setting the latitude register 102, as by depressing to engage a suitable clutch and rotating to drive the register mechanism. In this, the synchro receiver 108 conveniently is operated by the input of the manually introduced power to become a transmitter. The transmitter 59 thus becomes a receiver and is effective for rotating the pinion 49 and ring gear 80 for bringing axis 32 of the polar gyroscope rotor to parallel position relative to the earth's polar axis in a given latitude. Similarly, a manual set 252 on the instrument panel 100 is useful for manually setting the longitude register 103 to a given longitude reading. While the rotation of the register mechanism conveniently may be transmitted by connection through the differential gear 122 to operate the receiver 106 as a transmitter, and the transmitter 37 as a receiver for rotating the frames 44 and 54 of the longitude gyroscopes, this is relatively unimportant in the present embodiment.

Thus, it will be seen that in this invention there is provided gyroscopic apparatus by which the various objects hereinbefore noted together with many thoroughly practical advantages are successfully achieved. It will also be seen that the apparatus readily affords solutions to problems in the gyroscopic navigational field as from the standpoint of stability of operation.

While in the present embodiment particular emphasis has been placed upon the utilization of a single gyroscopic bed or plate for supporting longitude and latitude rotors, it will be appreciated that certain advantages still at times are had by omitting the latitude gyroscope rotor or rotors from the bed and employing the coupled longitude gyroscope rotors in proper balance with the bed and its arbors for measuring longitude.

As many possible embodiments may be made of my invention and as many changes may be made in the embodiment hereinbefore set forth, it will be understood that all matter described herein is to be interpreted as illustrative and not as a limitation.

I claim:

1. Navigational apparatus, comprising, gyroscopic bed means supported for freedom of rotation on a vertical axis suited for being substantially aligned with the earth's center of gravity and on a transverse axis suited for setting in a plane substantially normal to the polar axis of the earth, spaced frames mounted to said bed means and having freedom of rotation on substantially parallel axes at right angles to said transverse axis of support, gyroscopic rotors corresponding to said frames and mounted thereto for spinning on axes substantially at right angles to said substantially parallel axes and maintaining spatial direction as a basis for determining changes in longitude of position relative to the earth, ring gears around said frames and rotatable on the same axis therewith, and pinion means disposed on said bed means for rotation around said ring gears in accordance with sidereal rotation of the earth and changes in longitude of position and for interconnecting said rotors in precessional force opposition through said rings gears and frames.

2. Navigational apparatus, comprising, gyroscopic head means supported for freedom of rotation on a vertical axis suited for being substantially aligned with the earth's center of gravity, bed means for relative rotation with respect to said head means, the relative rotation being on a transverse axis suited for setting in a plane substantially normal to the polar axis of the earth, at least one polar gyroscopic rotor mounted to said bed means for maintaining spatial direction substantially parallel to the polar axis of the earth as a basis for determining latitude of position relative to the earth, a ring gear around said bed means and having an axis of rotation therewith substantially coincident with said transverse axis, a gear fixed for rotation on said head means and driven by said ring gear in accordance with changes in latitude of position, spaced frames mounted to said bed means and having freedom of rotation on substantially parallel axes at right angles to said transverse axis, gyroscopic longitude rotors corresponding to said frames and mounted thereto for spinning in opposition on axes substantially at right angles to said substantially parallel axes and maintaining spatial direction as a basis for determining changes in longitude of position relative to the earth, ring gears around said frames and rotatable on the same axis therewith, and pinion means disposed on said bed means for moving around in mesh with said frame ring gears in accordance with sidereal rotation of the earth and changes in longitude of position and for interconnecting said longitude gyroscopic rotors in substantially alike spatial direction on their spin axes and in precessional force opposition through said ring gears and frames.

3. Navigational apparatus, comprising, head means, carriage means for supporting said head means in freely rotatable relation on a vertical axis substantially aligned with the earth's center of gravity, bed means pivoted to said head means on a transverse axis suited for setting in a plane substantially normal to the polar axis of the earth, at least one polar gyroscopic rotor mounted to said bed means for maintaining spatial direction substantially parallel to the polar axis of the earth with rotation of the head means about said transverse axis in accordance with change in latitude of position, longitude gyroscopic rotors pivotally mounted to said bed means on axes substantially parallel to each other at right angles both to their axes of spin and said transverse axis to maintain spatial direction with rotation of said bed means about the same in accordance with sidereal rotation of the earth and change in longitude of position, said longitude gyroscope rotors being interconnected to produce bucking precessional forces to each other for stability during spin, and lock means effective between said head means and the carriage means to lock the same against relative rotation on said vertical axis only in the vicinity of the poles of the earth.

4. Navigational apparatus, comprising, head means, carriage means for supporting said head means in freely rotatable relation on a vertical axis substantially aligned with the earth's center of gravity, bed means pivoted to said head means on a transverse axis suited for setting in a plane substantially normal to the polar axis of the earth, at least one polar gyroscopic rotor mounted to said bed means for maintaining spatial direction substantially parallel to the polar axis of the earth with rotation of the head means about said transverse axis in accordance with change in latitude of position, at least one longitude gyroscopic rotor pivoted, substantially at right angles both to its axis of spin and said transverse axis, to the bed means for maintaining spatial direction with rotation of the latter about the same in accordance with sidereal rotation of the earth and change in longitude of position, and lock means effective between said head means and carriage means to lock the same against relative rotation only in the vicinity of the poles of the earth.

5. Navigational apparatus, comprising, gyroscopically supported rotors each having an individually corresponding axis of spin and means for spinning each of said rotors continuously in a suitable given spatial direction to afford a basis for determining longitude, and means interconnecting said rotors in bucking precessional force relation to counteract tendencies thereof to precess from said given spatial direction.

6. Navigational apparatus, comprising, gyroscopically supported rotors having substantially parallel axes of spin and means for spinning said rotors continuously in opposite directions of rotation in a suitable given spatial direction to afford a basis for determining longitude, and means interconnecting said rotors to counteract tendencies of said rotors to precess from said given spatial direction.

7. Navigational apparatus, comprising, head means supported for freedom of relation on an axis suited for being substantially aligned with the earth's center of gravity, longitude rotors gyroscopically disposed on said head means and each having an axis of spin suited for setting to substantially east-west spatial direction and means for spinning each of said rotors continuously in the east-west direction to afford a basis for determining longitude of position relative to the earth, and means interconnecting said rotors in bucking precessional force relation to counteract tendencies of each to precess from said spatial direction.

8. Navigational apparatus, comprising, gyroscopic bed means supported for freedom of rotation on an axis suited for being substantially aligned with the earth's center of gravity and on a transverse axis suited for setting in a plane substantially normal to the polar axis of the earth, gyroscopic rotors pivotally mounted to said bed means on axes substantially parallel to each other at right angles both to their axes of spin and said transverse axis of support and said rotors having means for continuously spinning the same in opposite directions of rotation and each in a given suitable spatial direction to afford a basis for determining longitude of position relative to the earth, and means interconnecting said rotors for preserving substantially alike spatial direction of these axes of spin and in bucking precessional force relation to counteract tendencies thereof to precess from said given spatial direction.

9. Navigational apparatus, comprising, gyroscopic bed means supported for freedom of rotation on an axis suited for being substantially aligned with the earth's center of gravity and on a transverse axis suited for setting in a plane substantially normal to the polar axis of the earth, at least one polar rotor connected with said bed means, and longitude rotors pivotally mounted to said bed means on axes at right angles both to their axes of spin and said transverse axis of support, and said polar rotor and longitude rotors each having means for continuously spinning the same for said polar rotor to stabilize said bed means with spin on an axis substantially parallel to the polar axis of the earth and for each of said longitude rotors to spin in suitable spatial direction to afford a basis for determining longitude of position relative to the earth, and means interconnecting said longitude rotors in bucking precessional force relation to counteract tendencies thereof to precess from said given spatial direction.

10. Navigational apparatus, comprising, head means supported for freedom of rotation on an axis suited for being substantially aligned with the earth's center of gravity, at least one latitude rotor and longitude rotors in gyroscopic assembly with said head means, each of said rotors having an axis of spin and means for continuously spinning each of the same with the axis of spin of said latitude rotor disposed substantially parallel to the polar axis of the earth and the axes of spin of said longitude rotors in substantially east-west spatial direction, means interconnecting said longitude rotors in bucking precessional force relation to counteract tendencies thereof to precess from said spatial direction, means for converting deflection in said assembly relative to the axes of spin of said longitude rotors on change in longitude to terms of longitude, and means for converting deflection in said assembly relative to the axis of spin of said latitude rotor on change in latitude to terms of latitude.

11. Navigational apparatus, comprising, head means supported for freedom of rotation on an axis suited for being substantially aligned with the earth's center of gravity, longitude rotors in gyroscopic assembly with said head means, each of said rotors having an individually corresponding axis of spin and means for spinning each of said rotors continuously in a suitable given spatial direction to afford a basis for measuring longitude, means interconnecting said longitude rotors in bucking precessional force relation to counteract tendencies thereof to precess from said spatial direction, and means for converting deflection in said assembly relative to the axes of spin of said longitude rotors on change in longitude to terms of longitude.

12. Navigational apparatus, comprising, gyroscopically supported frames each having an individually corresponding axis of rotation, rotors respectively corresponding to said frames and mounted to said frames with their axes of spin substantially at right angles to the axis of rotation of the corresponding frame and means for spinning each of said rotors continuously in a given spatial direction to afford a basis for determining longitude, ring gears around said frames and rotatable on the same axes therewith, pinion means having an axis fixed relative to the axes of said frames and driven by said gears in accordance with sidereal rotation of the earth and changes in longitude of position and for interconnecting said rotors in precessional force opposition through said ring gears and frames, a differential gear having power input sides and a power output side, one input side thereof to rotate in accordance with sidereal rotation of the earth and changes in longitude of position by power derived from said pinion means, and chronometer means for driving the other of the input sides of said differential gear in a direction to produce a resulting rotation of the output side in accordance with longitude.

13. Navigational apparatus, comprising, head means having a spindle, a pendulous carriage for supporting said spindle substantially on a vertical axis aligned with the earth's center of gravity, rotor means on said carriage for stabilizing the same, at least one latitude rotor and longitude rotors in gyroscopic assembly with said head means, each of said rotors having an axis of spin and means for continuously spinning each of the same with the axis of spin of said latitude rotor disposed substantially parallel to the polar axis of the earth and the axes of spin of said longitude rotors in substantially east-west spatial direction, and means interconnecting said longitude rotors in bucking precessional force relation to counteract tendencies thereof to precess from said said spatial direction.

14. Navigational apparatus, comprising, head means having a spindle, a pendulous carriage for pivotally supporting said spindle on a vertical axis substantially aligned with the earth's center of gravity, rotor means on said carriage for stabilizing the same, bed means pivoted to said head means on a transverse axis suited for setting in a plane substantially normal to the polar axis of the earth, at least one latitude rotor mounted to said bed means and having an axis of spin for disposition substantially parallel to the polar axis of the earth and longitude rotors pivotally mounted to said bed means on axes at right angles to their axes of spin and said transverse axis of support, and said latitude and longitude rotors each having means for spinning the same for said latitude rotor to maintain its axis of spin substantially parallel with the polar axis of the earth to afford a basis for determining latitude and for said longitude rotors to rotate in opposite directions of spin with respect to each other and in suitable spatial direction to afford a basis for determining longitude, and means interconnecting said longitude rotors in bucking precessional force relation to counteract tendencies thereof to precess from said given spatial direction.

15. Navigational apparatus, comprising, rotary electric motor armatures each having an individually corresponding gyroscopically supported frame rotatable on an axis and having an axis of spin on said frame at right angles to said frame axis, field means on said frames for spinning said armatures continuously each in a suitable given spatial direction to afford a basis for determining longitude, and means interconnecting said armatures in bucking precessional force relation to counteract tendencies of the armatures to precess from said given spatial direction.

16. Navigational apparatus, comprising, head means supported for freedom of rotation on an axis suited for being substantially aligned with the earth's center of gravity, at least one polar rotor and longitude rotors in gyroscopic assembly with said head means, each of said rotors having an axis of spin and means for continuously spinning the same for said gyroscope rotor to stabilize said assembly with spin on an axis substantially parallel to the polar axis of the earth and for each of said longitude rotors to spin with their spin axes in substantially east-west spatial direction to afford a basis for determining longitude of position relative to the earth, and means interconnecting said longitude rotors in bucking precessional force relation to counteract tendencies thereof to precess from said spatial direction.

17. Navigational apparatus, comprising, gyroscopically supported frames each having an individually corresponding axis of rotation, rotors respectively corresponding to said frames with their axes of spin substantially at right angles to the axis of rotation of the corresponding frame and means for spinning each of said rotors continuously in a given spatial direction to afford a basis for determining longitude, ring gears around said frames and rotatable on the same axes therewith, and pinion means having an axis fixed relative to the axes of said frames and driven by said gears in accordance with sidereal rotation of the earth and changes in longitude of position and for interconnecting said rotors in precessional force opposition through said ring gears and frames.

18. Navigational apparatus, comprising, a gyroscopic head supported for freedom of rotation on an axis suited for being substantially aligned with the earth's center of gravity, a gyroscopic bed rotatably supported to said head on an axis transverse to said head axis, gyroscopic rotors pivotally mounted to said bed on axes substantially at right angles to their axes of spin and said bed axis and said rotors having means for continuously spinning the same each in a suitable spatial direction to afford a basis for determining longitude of position relative to the earth, and means interconnecting said rotors in bucking precessional force relation to counteract tendencies thereof to precess from said given spatial direction.

FREDERICK H. DOWNING.

REFERENCES CITED

The following references are of record in the file of this patent:

UNITED STATES PATENTS

| Number | Name | Date |
|---|---|---|
| 2,414,291 | Evans | Jan. 14, 1947 |

FOREIGN PATENTS

| Number | Country | Date |
|---|---|---|
| 352,431 | France | May 30, 1905 |
| 646,425 | Germany | June 14, 1937 |